E. G. Warner,
Wheel Harrow.
No. 94,153.   Patented Aug 24, 1869.
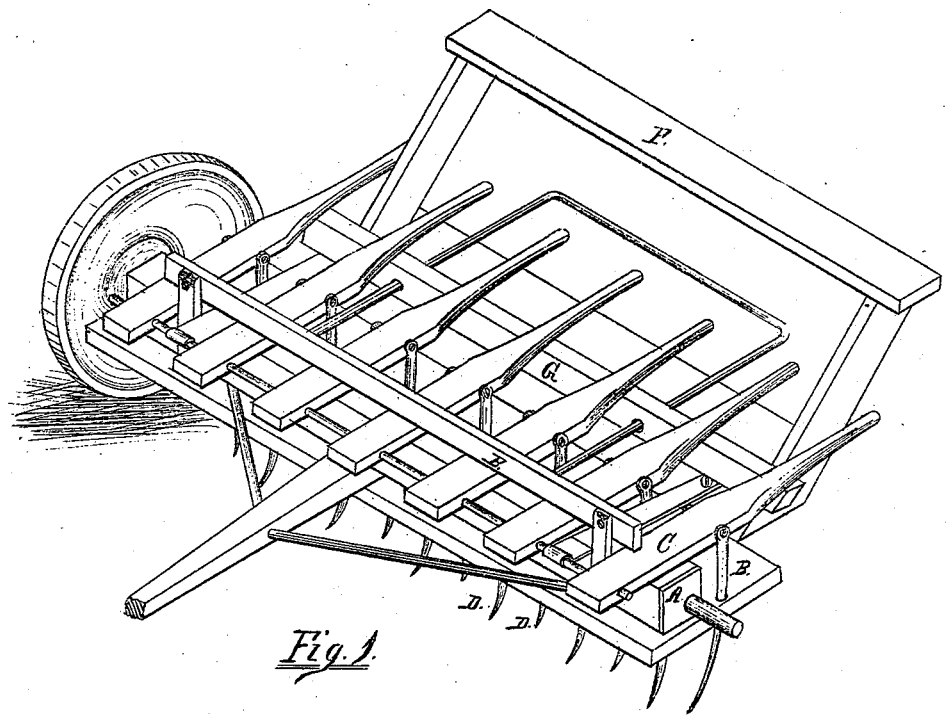
Fig. 1
Fig. 2
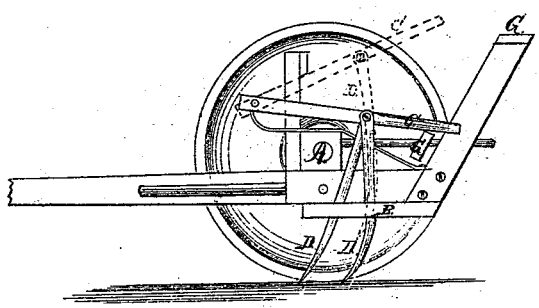
Witnesses
B. Blake
Joseph Corns
Inventor
Eli G. Warner

United States Patent Office.

ELI G. WARNER, OF UNION TOWNSHIP, OHIO.

Letters Patent No. 94,153, dated August 24, 1869.

IMPROVEMENT IN HARROWS.

The Schedule referred to in these Letters Patent and making part of the same.

*To all whom it may concern:*

Be it known that I, ELI G. WARNER, of Union township, in the county of Madison, and State of Ohio, have invented an Improved Form of a Harrow; and I do declare that the following is a full and exact description thereof, reference being had to the accompanying drawings, and letters of reference marked thereon, making a part of this specification, in which—

Figure 1 is a general view, (with the wheel on the right removed.)

Figure 2, is a sectional view, showing the manner in which I construct my harrow.

The letter A represents an axle, to the under part of which I attach a board, B, perforated with as many holes as there are teeth in the harrow.

The use of this board is twofold, namely, to prevent the teeth from being bent from their proper shape, which is shown at the letters D D in fig. 2; also, for the purpose of cleaning the teeth, (should any of them become choked with weeds, or other obstacles,) by raising the lever C, as shown in fig. 2, and to which the teeth are attached.

The letter E represents a check-rail, to prevent the teeth from being raised out of the cleaning-board B.

The letter F represents a seat for the driver, and from which he can raise any tooth, by means of the lever C, or all the teeth can be raised out of the ground at once, by the lifting-bar G.

What I claim as my invention, and desire to secure by Letters Patent, is—

The construction of a harrow, with curved teeth passing through a perforated board, B, said teeth to be raised singly, by means of a lever, C, and collectively, by means of a lifting-bar, G, which, by raising or depressing, will also regulate the depth of the teeth in the ground.

ELI G. WARNER.

Witnesses:
   B. BLAKE,
   JOSEPH CARNS.